United States Patent
Radhakrishnan et al.

(10) Patent No.: US 9,569,361 B2
(45) Date of Patent: Feb. 14, 2017

(54) PRE-FETCH CHAINING

(71) Applicant: Samsung Electronics Co., Ltd., Suwon-si, Gyeonggi-do (KR)

(72) Inventors: Arun Radhakrishnan, Austin, TX (US); Kevin Lepak, Austin, TX (US); Rama Gopal, Austin, TX (US); Murali Chinnakonda, Austin, TX (US); Karthik Sundaram, Austin, TX (US); Brian Grayson, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 297 days.

(21) Appl. No.: 14/325,343

(22) Filed: Jul. 7, 2014

(65) Prior Publication Data
US 2015/0199275 A1 Jul. 16, 2015

Related U.S. Application Data (60) Provisional application No. 61/926,247, filed on Jan. 10, 2014.

(51) Int. Cl.
*G06F 12/08* (2016.01)

(52) U.S. Cl.
CPC ... *G06F 12/0862* (2013.01); *G06F 2212/6022* (2013.01)

(58) Field of Classification Search
CPC ...... G06F 12/00; G06F 12/0215; G06F 12/08; G06F 12/0806; G06F 12/0811; G06F 12/0862
USPC ................ 711/100, 117, 118, 137, 154, 170
See application file for complete search history.

(56) References Cited

U.S. PATENT DOCUMENTS

| | | | | |
|---|---|---|---|---|
| 5,778,435 | A * | 7/1998 | Berenbaum | G06F 9/3806 711/137 |
| 7,346,741 | B1 * | 3/2008 | Keish | G06F 9/3802 711/122 |
| 8,074,029 | B2 | 12/2011 | Hondou | |
| 8,156,287 | B2 | 4/2012 | Bose et al. | |
| 8,281,078 | B2 | 10/2012 | Gendler | |
| 2006/0212659 | A1 * | 9/2006 | Dieffenderfer | G06F 12/0833 711/141 |
| 2012/0030431 | A1 * | 2/2012 | Anderson | G06F 12/0862 711/137 |
| 2013/0145102 | A1 | 6/2013 | Wang et al. | |

(Continued)

OTHER PUBLICATIONS

Fritts, J., "Multi-level memory prefetching for media and stream processing," Multimedia and Expo, 2002. ICME '02. Proceedings. 2002 IEEE International Conference on (vol. 2), pp. 101-104, vol. 2, Print ISBN: 0-7803-7304-9, INSPEC Accession No. 7528955, Digital Object Identifier:10.1109/ICME.2002.1035522.

*Primary Examiner* — Tuan Thai
(74) *Attorney, Agent, or Firm* — Renaissance IP Law Group LLP (57) ABSTRACT

According to one general aspect, an apparatus may include a cache pre-fetcher, and a pre-fetch scheduler. The cache pre-fetcher may be configured to predict, based at least in part upon a virtual address, data to be retrieved from a memory system. The pre-fetch scheduler may be configured to convert the virtual address of the data to a physical address of the data, and request the data from one of a plurality of levels of the memory system. The memory system may include a plurality of levels, each level of the memory system configured to store data.

15 Claims, 4 Drawing Sheets

(56) References Cited

U.S. PATENT DOCUMENTS

2013/0254485 A1 9/2013 Kannan et al.
2014/0149632 A1* 5/2014 Kannan ............... G06F 12/0862
　　　　　　　　　　　　　　　　　　711/3

* cited by examiner

PRE-FETCH CHAINING

CROSS-REFERENCE TO RELATED APPLICATION

This application claims priority under 35 U.S.C. §119 to Provisional Patent Application Ser. No. 61/926,247, entitled "PRE-FETCH CHAINING" filed on Jan. 10, 2014. The subject matter of this earlier filed application is hereby incorporated by reference.

TECHNICAL FIELD

This description relates to information storage, and more specifically to memory cache management.

BACKGROUND

Generally computers and the programs executed by them have a voracious appetite for unlimited amounts of fast memory. Unfortunately, memory (especially fast memory) is generally expensive, both in terms of cost and die area. The traditional solution to the desire for unlimited, fast memory is a memory hierarchy or system of tiers or levels of memories. In general, the tiered memory system includes a plurality of levels of memories, each level slower but larger than the previous tier.

A typical computer memory hierarchy may include three levels. The fastest and smallest memory (often called a "Level 1 (L1) cache") is closest to the processor and includes static random access memory (SRAM). The next tier or level is often called a Level 2 (L2) cache, and is larger but slower than the L1 cache. The third level is the main memory and generally includes dynamic RAM (DRAM), often inserted into memory modules. However, other systems may have more or less memory tiers. Also, in some systems the processor registers and the permanent or semi-permanent storage devices (e.g., hard drives, solid state drives, etc.) may be considered part of the memory system.

The memory system generally makes use of a principle of inclusiveness, wherein the slowest but largest tier (e.g., main memory, etc.) includes all of the data available. The second tier (e.g., the L2 cache, etc.) includes a sub-set of that data, and the next tier from that (e.g., the L1 cache, etc.) includes a second sub-set of the second tier's subset of data, and so on. As such, all data included in a faster tier is also included by slower tier.

Generally, the caches decide what sub-set of data to include based upon the principle of locality (e.g., temporal locality, spatial locality, etc.). It is assumed that a program will wish to access data that it has either recently accessed or is next to the data it has recently accessed. For example, if a movie player program is accessing data, it is likely that the movie player will want to access the next few seconds of the movie, and so on.

However, occasionally a program will request a piece of data that is not available in the fastest cache (e.g., the L1 cache, etc.). That is generally known as a "cache miss" and causes the fastest cache to request the data from the next memory tier (e.g., the L2 cache). This is costly to processor performance as a delay is incurred in determining that a cache miss has occurred, retrieving the data by the L1 cache, and providing it to the processor. Occasionally, the next tier of memory (e.g., the L2 cache, etc.) may not include the requested data and must request it from the next tier (e.g., main memory, etc.). This generally causes further delays.

SUMMARY

According to one general aspect, an apparatus may include a cache pre-fetcher, and a pre-fetch scheduler. The cache pre-fetcher may be configured to predict, based at least in part upon a virtual address, data to be retrieved from a memory system. The pre-fetch scheduler may be configured to convert the virtual address of the data to a physical address of the data, and request the data from one of a plurality of levels of the memory system. The memory system may include a plurality of levels, each level of the memory system configured to store data.

According to another general aspect, a method may include predicting, based at least in part upon a virtual address, data likely to be accessed, from a memory system, by an instruction. The method may also include selecting, from a plurality of levels of the memory system, a determined level of the memory system to store pre-fetched data, wherein the pre-fetched data comprises the data predicted to be accessed by the instruction. The method may further include causing the pre-fetched data to be stored by the determined level of the memory system before the pre-fetched data is accessed by the instruction.

According to another general aspect, a system may include an execution unit, a pre-fetch unit, and a memory system. The execution unit may be configured to execute one or more instructions. The pre-fetch unit may be configured to identify pre-fetched data by predicting, based at least in part upon a virtual address, data to be accessed by one or more of the instructions, and cause the pre-fetched data to be stored within one of a plurality of levels of a memory system prior to the pre-fetched data being accessed by the instruction. The memory system may include a plurality of levels, wherein each level of the memory system is configured to store data.

The details of one or more implementations are set forth in the accompanying drawings and the description below. Other features will be apparent from the description and drawings, and from the claims.

A system and/or method for information storage, and more specifically to memory cache management, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
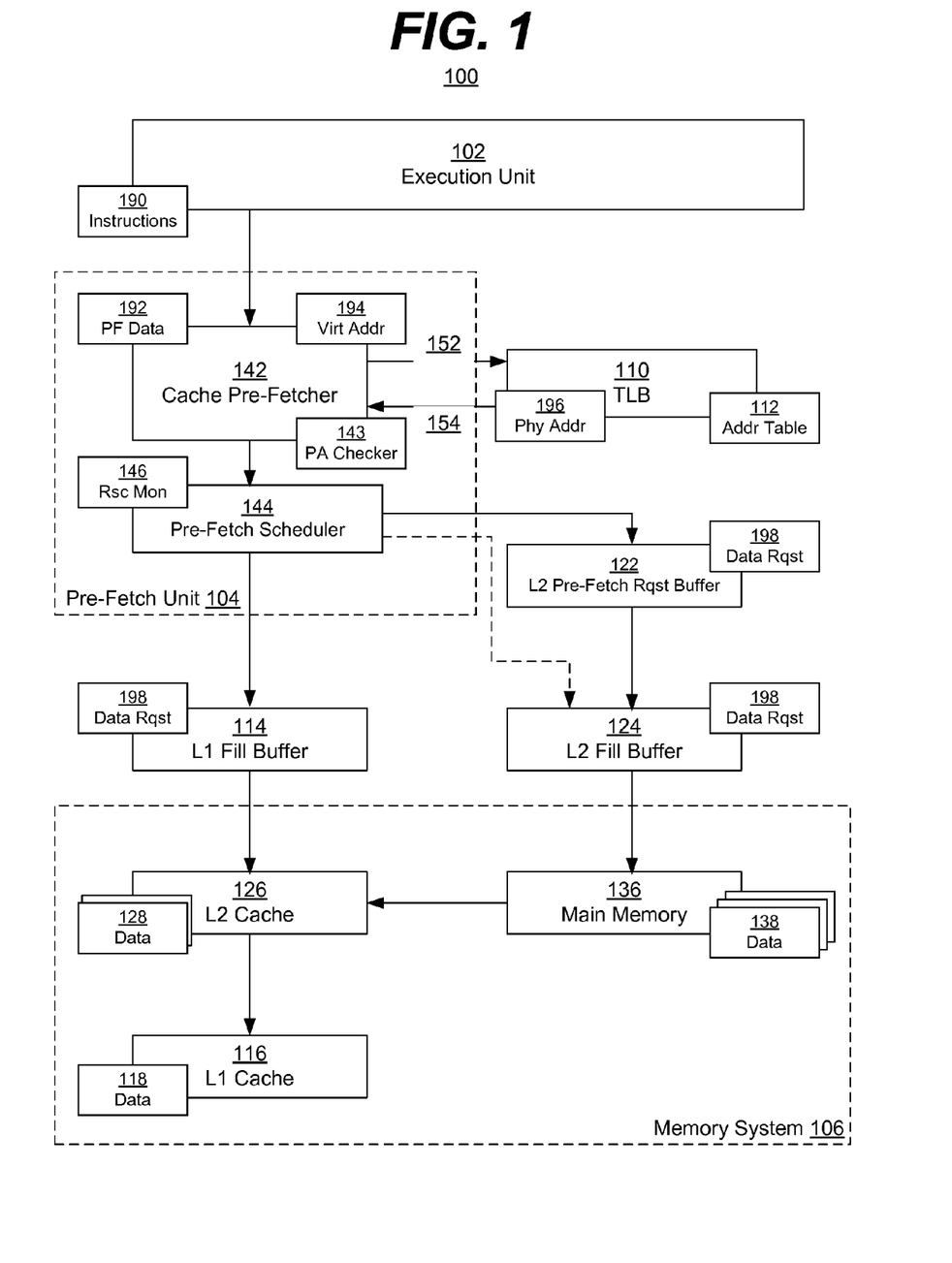
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a three-tier memory system 106 (e.g., L1 cache 116, L2 cache 126, and main memory 136, etc.). It is understood that the above is merely one illustrative example to which the disclosed subject matter is not limited.

In various embodiments, the system 100 may include an execution unit 102 configured to execute or process one or more instructions 190. In such an embodiment, these instructions 190 may make up a program or application (or part thereof). In various embodiments, the execution unit 102 may be included in a processor or other larger computer component. In various embodiments, these instructions 190 may occasionally access (e.g., read from, write to, etc.) data stored in a memory system 106 (e.g., L1 cache 116, L2 cache 126, and main memory 136, etc.).

In such an embodiment, when these instructions 190 access data, they may first request the data from the L1 cache 116, as the first or fastest tier of the memory system 106. In one such embodiment, the L1 cache 116 may store a sub-set of data 118. If the requested data is included in the data 118, the L1 cache 116 may supply the data (or update the stored data 118 in the case of a write instruction 190), and the execution unit 102 may proceed without incident.

However, in various embodiments, if the requested data is not included in the data 118 (i.e. a cache miss), the L1 cache 116 may, in turn, request the data from the L2 cache 126 (i.e. the next level or tier in the memory system 106). This may have a detrimental or undesired effect on the ability of the execution unit 102 to proceed, and may cause the execution unit 102 to delay or stall the processing of the instructions 190.

Traditionally, the L1 cache 116 could only request one piece of data from the L2 cache 126 at a time. However, in the illustrated embodiment, the system 100 may include an L1 fill buffer 114 configured to queue data requests 198 to the L2 cache 126 made by the L1 cache 116 or on its behalf, as described herein. In such an embodiment, the L1 cache 116 may be able to accommodate additional requests for data from the execution unit 102, while awaiting the fulfillment of the data that caused the cache miss.

Likewise, the L2 cache 126 may store a sub-set of data, 128. If the cache-miss data is included in the data 128, the data may be supplied to the L1 cache 116 relatively forthwith. If not, another cache miss is generated, this time at the L2 cache 126 level. The L2 cache 126 may request the missing data from the main memory 136 (or next tier in the memory system 106), and the main memory 136 is expected to have the data in its stored data 138. In various embodiments, the main memory 136 may only store a sub-set of data in 138, and the entirety of possible data may be stored in a storage medium or other semi-permanent, or permanent memory device (e.g., hard drive, solid state device, optical disc, etc.), but that is not illustrated. It is understood that the above are merely a few illustrative examples to which the disclosed subject matter is not limited.

Cache misses are generally considered undesirable. In the illustrated embodiment, the system 100 may include a pre-fetch unit 104 configured to predict what data is likely to be requested by the instructions 190, and then cause that predicted data to be readily available in the memory system 106. In the illustrated embodiment, the pre-fetch unit 104 may reduce the number of cache misses directly caused by the instructions 190. In such an embodiment, by requesting data 192 before the instruction 190 that needs (or is expected to need) the data is executed, a cache miss caused by requesting the data 192 may be resolved by the time the instruction 190 needs the data 192. In such an embodiment, the execution unit 102 may not be aware that such a cache miss occurred, and may not stall or otherwise have its execution of the instructions 190 adversely affected. It is understood that the above is merely one illustrative example to which the disclosed subject matter is not limited.

In the illustrated embodiment, the pre-fetch unit 104 may include a cache pre-fetcher 142. In such an embodiment, the cache pre-fetcher 142 may be configured to predict (e.g., via temporal and/or spatial locality, etc.) what data 192 is likely to be desired by the instructions 190. In various embodiments, this prediction may be based, at least in part, upon a virtual address 194 associated with the data 192.

In various embodiments, the cache pre-fetcher 142 may be configured to receive virtual addresses 194 associated with the instructions 190. Traditionally a pre-fetcher may operate using physical addresses 196 that are often grouped into memory pages of four kilobytes (KB) in size. In such an embodiment, the pre-fetch unit may have to re-train or re-evaluate its predictions when a physical address 196 exceeds or crosses such a page boundary. Further, physical addresses 196 are often dis-contiguous and may not be located next to each other. In which case, the principles of spatial locality may not apply. Conversely, in various embodiments, virtual addresses 194 may not make use of page boundaries and may, by their nature, be contiguous or grouped together in a continuous flow of data, such that the next address is predicable. It is understood that the above are merely a few illustrative examples to which the disclosed subject matter is not limited.

In the illustrated embodiment, the cache pre-fetcher 142 may make use of the virtual addresses 194. In such an embodiment, the internal structures of the pre-fetch unit 104 may be expanded to handle address differences greater than that experienced by the typical or system memory page (e.g., 4 KB, 32 KB, etc.). In such an embodiment, the pre-fetch unit 104 may include or accommodate an address space greater than the memory page. In such an embodiment, these wider structures may include a wider address space, larger training tables, larger confirmation structures, etc. It is understood that the above are merely a few illustrative examples to which the disclosed subject matter is not limited.

However, the memory system 106 may still operate using physical addresses 196. In such an embodiment, the pre-fetch unit 104 may send a translation request 152 to a translation look-aside buffer (TLB) 110. In various embodiments, the translation request 152 may include a request to translate a virtual address 194 (employed by the pre-fetch unit 104) to a physical address 196 (employed by the memory system 106).

In various embodiments, the system 100 may include a TLB 110. In such an embodiment, the TLB 110 may be configured to convert or translate a virtual address 194 to a physical address 196. In various embodiments, the TLB 110 may include an address table 112. In various embodiments, the address table 112 may include a content-addressable memory (CAM) that uses the virtual address as a search key and returns a physical address as the search result. In various embodiments, the TLB 110 may, in response to the translation request 152 and via a translation response 154, return the physical address 196 associated with the virtual address 194.

In some embodiments, the address table 112 may not include the requested virtual address 194. In such an embodiment, this TLB miss may cause a TLB reload. In various embodiments, a TLB reload may involve new virtual address to physical address mappings being entered into the address table 112. In one such embodiment, the pre-fetch unit 104 may not only pre-fetch data into the various tiers of the memory system 106, but may also cause the TLB 110 to pre-fetch entries (e.g., virtual address/physical address pairings, etc.) into the address table 112. It is understood that the above is merely one illustrative example to which the disclosed subject matter is not limited.

In various embodiments, the pre-fetch unit 104 may include a physical address checker 143. In such an embodiment, the physical address checker 143 may be configured to determine if the physical address 196 associated with the pre-fetch data 192 is valid. For example, the physical address 196 may lead to an invalid or protected portion of memory (e.g., a memory mapped input/output (I/O) region, etc.). In such an embodiment, if the physical address 196 associated with the pre-fetch data 192 is invalid, the pre-fetch unit 104 may not request that the data 192 be retrieved. Conversely, in one embodiment, if the physical address 196 associated with the pre-fetch data 192 is valid, the pre-fetch unit 104 may proceed with the process of requesting or pre-fetching the data 192.

In some embodiments, the pre-fetch unit 104 may include a pre-fetch scheduler 144. In various embodiments, the pre-fetch scheduler 144 may be configured to request the data 192 from one or more tiers of the memory system 106. In the illustrated embodiment, the pre-fetch scheduler 144 is shown requesting data from only two tiers of the memory system 106. However, it is understood that in other embodiments the pre-fetch scheduler 144 may request data 192 from more than two tiers. Further, in various embodiments, the memory system 106 may include more that the three tiers illustrated (e.g., an L0 cache, an L3 cache, etc.). It is understood that the above are merely a few illustrative examples to which the disclosed subject matter is not limited.

In various embodiments, the pre-fetch scheduler 144 may include a resource monitor 146 configured to monitor one or more system resources (e.g., the memory system 106, a bus usage, processor usage, etc.). In such an embodiment, based upon an amount or status of one or more system resources being used or predicted to be used, the pre-fetch scheduler 144 may request the data 192 from one or another of the tiers of the memory system 106. In various embodiments, a predefined set of rules or criteria may be employed to determine which tier to send the data request 198 for the data 192.

In the illustrated embodiment, the system 100 may prefer to pre-fetch data into the L1 cache 116. In such an embodiment, the resource monitor 146 may monitor the level or number of data requests 198 currently in the L1 fill buffer 114. If the L1 fill buffer 114 has space for additional data requests 198, the pre-fetch unit 104 may inject or add an additional fill request 198 into the L1 fill buffer 114. In such an embodiment, the L1 fill buffer 114, as described above, may request the data 192 from the L2 cache 126, and cause the requested data 192 to be placed in the L1 cache 116. It is understood that the above is merely one illustrative example to which the disclosed subject matter is not limited.

Conversely, if the L1 fill buffer 114 does not have space for additional data requests 198, the pre-fetch unit 104 may inject or add an additional fill request 198 into the L2 fill buffer 124. As described above, in various embodiments, the L2 fill buffer 124 may request the data 192 from the main memory 136, and cause the requested data 192 to be placed in the L2 cache 126.

The above illustrative example of selecting between the L1 fill buffer 114 and the L2 fill buffer 124 based upon the free capacity of, or the level or number of data requests 198 currently in the L1 fill buffer 114 may be considered a case in which a predefined set of rules or criteria is employed to determine which tier to send the data request 198 to. In such an embodiment, the criteria may include the level of data requests 198 currently in the L1 fill buffer 114 (e.g., completely full, 80% full, 2 or more available request entries or slots, etc.), and the monitored system resource would be the L1 fill buffer 114. It is understood that the above is merely one illustrative example to which the disclosed subject matter is not limited.

In various other embodiments, the criteria or rules may include one or more of, for example: an amount of congestion on the bus that services the respective fill buffer, a number of ports in-use by the respective caches (e.g., L1 cache 116, L2 cache 126), a cache line utilization rate for a certain cache (e.g., the L1 cache 116, etc.), a state of the data in a cache coherency protocol (e.g., is the data owned by another processor or execution unit?), etc. In some embodiments, the criteria or predefined rules selected may attempt to balance or optimize one or more features of the system, such as, for example, efficiency of the caches, minimize latencies, avoid multi-processor coherency issues, reduce cache thrashing, etc. In various embodiments, depending upon the answer to the rule, it may be more or less desirable to pre-fetch the data to one tier or the other. For example, it may be desirable to pre-fetch the data into the tier with the least amount of bus congestion. In another example, it may be desirable to pre-fetch data to a second tier if pre-fetching data to the first tier would cause another piece of previously pre-fetched, but as yet un-used data to be evicted from the first tier. In yet another example, it may be desirable to pre-fetch the data to a tier shared amongst a plurality of processors instead of to a tier exclusively owned by a single processor, etc. It is understood that the above are merely a few illustrative examples to which the disclosed subject matter is not limited.

In the illustrated embodiment, the system 100 may include an L2 pre-fetch request buffer 122. In various embodiments, the L2 pre-fetch request buffer 122 may be configured to queue data requests 198 from the pre-fetch unit 104 into the L2 fill buffer 124. In such an embodiment, the L2 pre-fetch request buffer 122 may provide additional capacity or depth for the L2 fill buffer 124. In such an embodiment, data requests 198 may be entered into the L2 pre-fetch request buffer 122 and then, in turn, placed into the L2 fill buffer 124. In another embodiment, if the L2 fill buffer 124 has capacity, the L2 pre-fetch request buffer 122 may be skipped and data requests 198 may be entered directly into the L2 fill buffer 124. It is understood that the above are merely a few illustrative examples to which the disclosed subject matter is not limited.

In various embodiments, the resource monitor 146 or pre-fetch unit 104 may be configured to determine if the pre-fetch data 192 already exists in either the L1 cache 116 or the L2 cache 126. In one embodiment, if the data 192 is already included in the data 118 of the L1 cache 116, the pre-fetch unit 104 may not issue a data request 198 for the data 192.

In another embodiment, if the data 192 is not included in the data 118 of the L1 cache 116, but is included in the data 128 of the L2 cache 126, the pre-fetch unit 104 may only issue a data request 198 to the L1 cache 116 (via the L1 fill buffer 114), even if the L1 fill buffer 114 is currently full. In such an embodiment, the pre-fetch unit 104 may not issue the data request 198 to the L2 cache 126 (via the L2 fill buffer 124, etc.), as the L2 cache 126 already includes the data 192. In such an embodiment, the pre-fetch unit 104 may be configured to stall or otherwise wait until the L1 fill buffer 114 has capacity for the data request 198. In various embodiments, this may include allowing other data requests 198 (for other pieces of data 192) to be issued to the L2 cache 126 (via the L2 fill buffer 124) while waiting for capacity in the L1 fill buffer 114.

In yet another embodiment, if the data 192 is included in neither the data 118 of the L1 cache 116, nor the data 128 of the L2 cache 126, the pre-fetch unit 104 may only issue a data request 198 to the L2 cache 126 (via the L2 fill buffer 124 or L2 pre-fetch request buffer 122). In such an embodiment, a data request 198 made via the L1 fill buffer 114 may cause a cache miss in the L2 cache 126. Such a L2 cache miss would then cause the normal L2 cache miss mechanism to make its own data request 198 entry in the L2 fill buffer 124. While this may have the same ultimate effect of retrieving the data 192 from the main memory 136 (or next tier in the memory system 106 in a four or higher tiered memory system 106), an extra delay would be incurred as the L1 cache would process the cache miss. In the illustrated embodiment, by issuing the data request 198 directly to the L2 fill buffer 124 (or L2 pre-fetch request buffer 122) from the pre-fetch unit 104, the data request 198 may be fulfilled more quickly. It is understood that the above are merely a few illustrative examples to which the disclosed subject matter is not limited.

Figure 2:
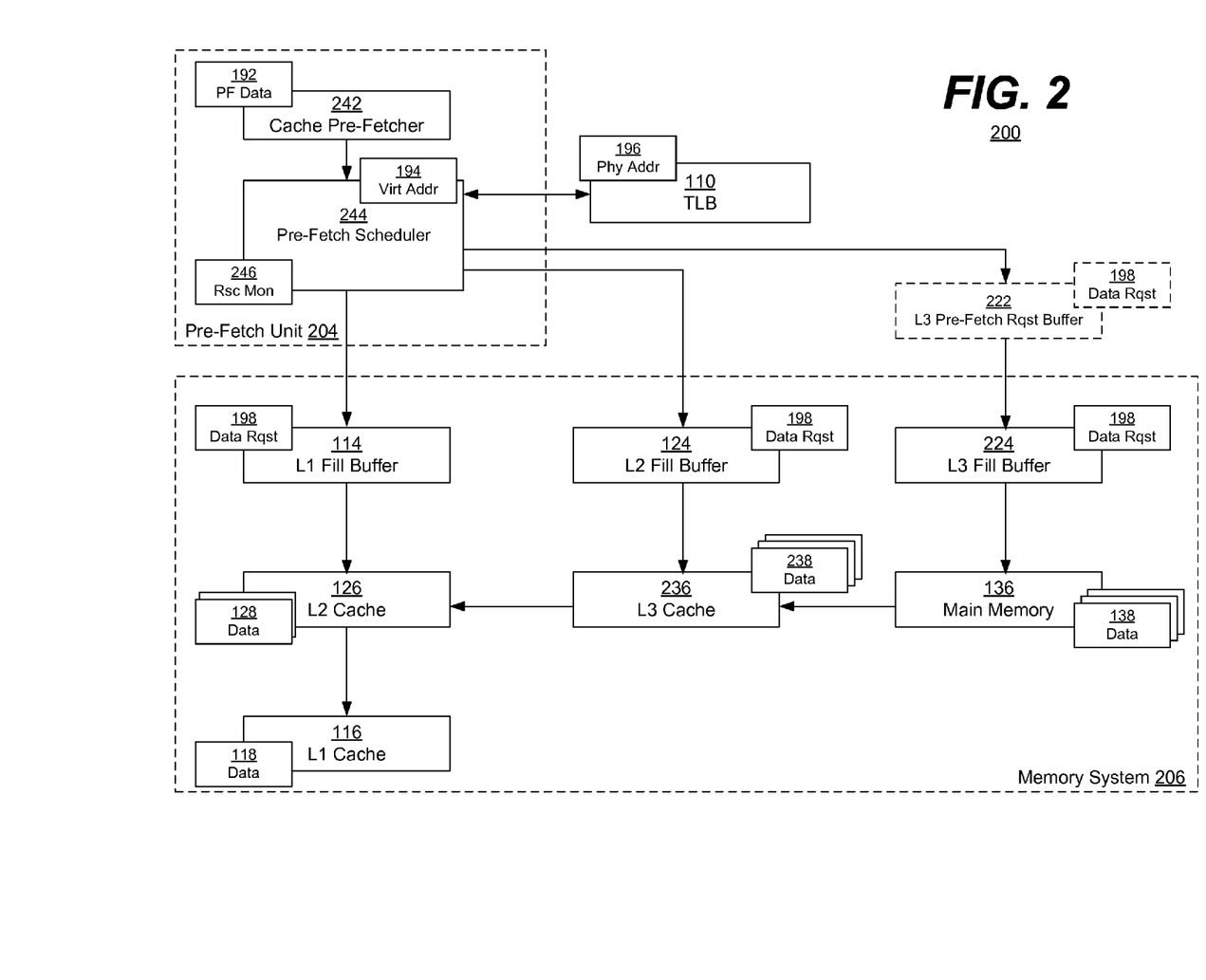
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a four-tier memory system 206 (e.g., L1 cache 116, L2 cache 126, L3 cache 236, and main memory 136, etc.). It is understood that the above is merely one illustrative example to which the disclosed subject matter is not limited.

In the illustrated embodiment, the pre-fetch unit 204 may be configured to request the pre-fetch data 192 from one of the three tiers of the memory system 206. In such an embodiment, the pre-fetch unit 204 may include a pre-fetch scheduler 244 configured to select between three of the four tiers or levels of the memory system 206 when making the data request 198. In one embodiment, the pre-fetch scheduler 244 may include a resource monitor 246 configured to monitor a system resource level of the more complex memory system 206 (compared to the three tiered memory system 106 of FIG. 1). For example, the resource monitor 246 may be configured to monitor the availability of the L2 fill buffer 124 in addition to the availability provided by the L1 fill buffer 114.

In such an embodiment, if both the L1 fill buffer 114 and the L2 fill buffer 124 are full, the data request 198 may be made to the L3 fill buffer 224. In another embodiment, pre-fetch unit 204 may determine which cache level or tier will receive the data request 198 based, at least in part, upon which cache level or tier is currently storing the data 192, as described above. For example, if neither the L1 cache 116 nor L2 cache 126 include the desired pre-fetch data 192, the data request 198 may be made to the L3 cache 236 (via the L2 fill buffer 124). It is understood that the above are merely a few illustrative examples to which the disclosed subject matter is not limited.

In various embodiments, an L3 pre-fetch request buffer 222 may be employed to increase the effective capacity of the L3 fill buffer 224, similarly to that described in FIG. 1 in relation to the L2 pre-fetch request buffer 122. In various embodiments, a system similar to system 200 may also include an L2 pre-fetch request buffer (not shown in FIG. 2) in addition to the L3 pre-fetch request buffer 222. In another embodiment, the L3 pre-fetch request buffer 222 may not be included by the system. In yet another embodiment, L3 pre-fetch request buffer 222 may not be included but an L2 pre-fetch request buffer may be included, depending upon the expected usage levels of the various fill buffers. It is understood that the above are merely a few illustrative examples to which the disclosed subject matter is not limited.

In the illustrated embodiment, it is shown that the memory system 206 may include the various fill buffers, e.g., L1 fill buffer 114, L2 fill buffer 124, and L3 fill buffer 224. It is understood that the above is merely one illustrative example to which the disclosed subject matter is not limited.

In the illustrated embodiment, the pre-fetch scheduler 244 may be configured to convert the virtual address 194 to the physical address 196. In various embodiments, the pre-fetch scheduler 244 may accomplish this with the aid of the TLB 110, as described above. In such an embodiment, the cache pre-fetcher 242 may still be configured to predict the data 192 to be pre-fetched and may do so based upon the virtual addresses 194. It is understood that the above is merely one illustrative example to which the disclosed subject matter is not limited.

Figure 3:
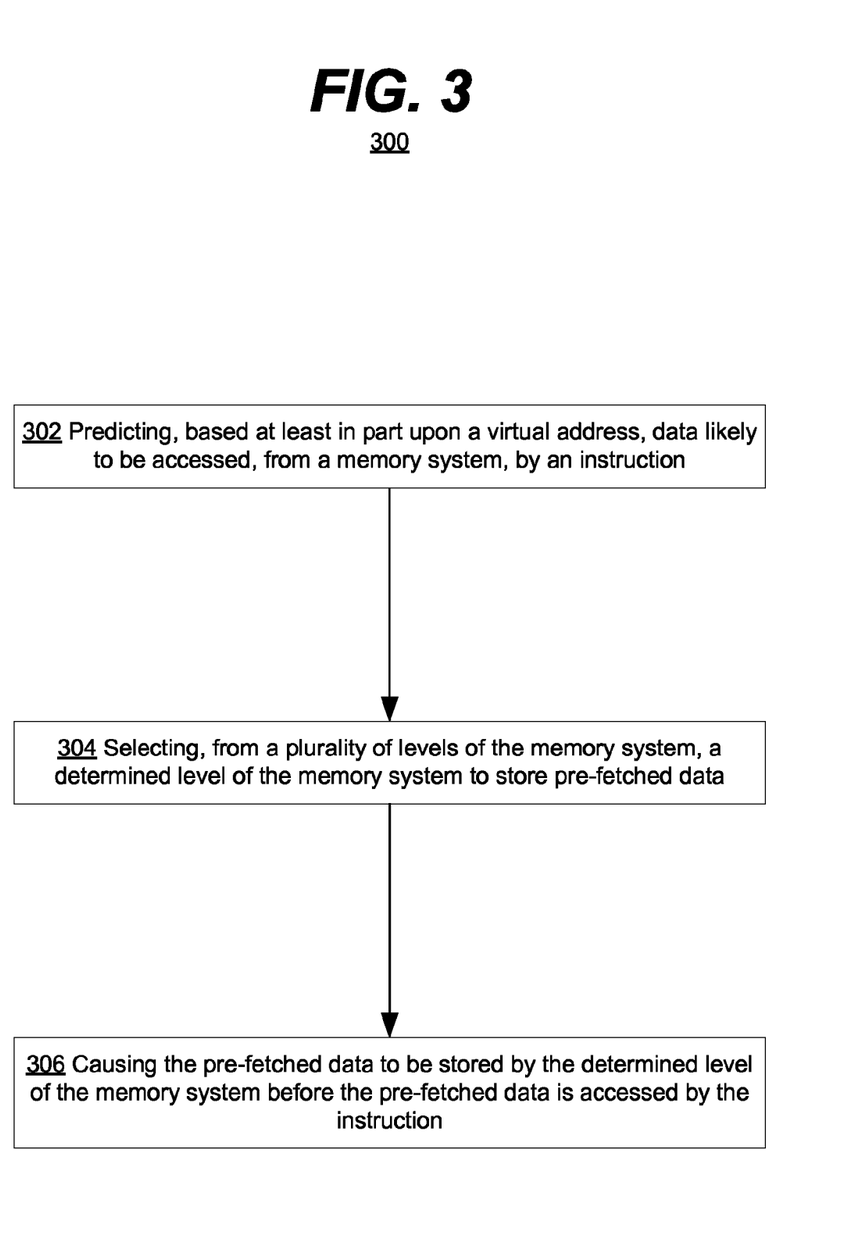
FIG. 3 is a flowchart of an example embodiment of a technique in accordance with the disclosed subject matter.

FIG. 3 is a flow chart of an example embodiment of a technique in accordance with the disclosed subject matter. In various embodiments, the technique 300 may be used or produced by the systems such as those of FIG. 1, 2, or 3. Although, it is understood that the above are merely a few illustrative examples to which the disclosed subject matter is not limited. It is understood that the disclosed subject matter is not limited to the ordering of or number of actions illustrated by technique 300.

Block 302 illustrates that, in one embodiment, a prediction may be made, based at least in part upon a virtual address, data likely to be accessed, from a memory system, by an instruction, as described above. In various embodiments, predicting data likely to be accessed by an instruction may include crossing a page boundary when predicting data, as described above. In another embodiment, predicting data likely to be accessed by an instruction may include converting the virtual address associated with the pre-fetch data to a physical address, and determining that the physical address is not comprised by a restricted memory area, as described above. In yet another embodiment, predicting data likely to be accessed by an instruction may include converting the virtual address associated with the pre-fetch data to a physical address via a translation look aside buffer, as described above. In such an embodiment, converting the virtual address may include pre-fetching a translation lookaside buffer entry, as described above. In various embodiments, one or more of the action(s) illustrated by this Block may be performed by the apparatuses or systems of FIG. 1, 2, or 4, the pre-fetch units of FIG. 1 or 2, the cache pre-fetcher of FIG. 1, or the pre-fetch scheduler of FIG. 2, as described above.

Block 304 illustrates that, in one embodiment, a determined level of the memory system to store pre-fetched data may be selected from a plurality of levels of the memory system, as described above. In some embodiments, the pre-fetched data may include the data predicted to be accessed by the instruction, as described above. In various embodiments, selecting a determined level of the memory system may include selecting a first level of the memory system if a first level fill buffer associated with the first level of the memory system comprises capacity for an additional request for the pre-fetch data, or selecting a second level of the memory system if a first level fill buffer associated with the first level of the memory system does not comprise capacity for an additional request for the pre-fetch data, as described above. In various embodiments, one or more of the action(s) illustrated by this Block may be performed by the apparatuses or systems of FIG. 1, 2, or 4, the pre-fetch units of FIG. 1 or 2, the pre-fetch scheduler of FIG. 1, or the pre-fetch scheduler of FIG. 2, as described above.

Block 306 illustrates that, in one embodiment, one may cause the pre-fetched data to be stored by the determined level of the memory system before the pre-fetched data is accessed by the instruction, as described above. In various embodiments, the determined level of the memory system may include either a first level of the memory system or a second level of the memory system. In such an embodiment, causing the pre-fetched data to be stored by the determined level of the memory system may include, if the determined level comprises the first level of the memory system, injecting requests for data for the pre-fetched data into a first level fill buffer configured to store requests for data to be stored within the first level of the memory system. Further, if the determined level comprises the second level of the memory system, causing may include injecting requests for data for the pre-fetched data into a second level fill buffer configured to store the requests for data to be stored within the second level of the memory system, as described above. In one such embodiment, causing the pre-fetched data to be stored by the determined level of the memory system may include, if the determined level comprises the second level of the memory system, injecting requests for data for the pre-fetched data into the second level fill buffer, if the second level fill buffer comprises capacity to store the requests for data, or, if not, injecting requests for data for the pre-fetched data into a second level pre-fetch request buffer configured to store the requests for data that are to be placed within the second level fill buffer when the second level fill buffer comprises capacity for an additional request for data, as described above. In various embodiments, one or more of the action(s) illustrated by this Block may be performed by the apparatuses or systems of FIG. 1, 2, or 4, the pre-fetch units of FIG. 1 or 2, the pre-fetch scheduler of FIG. 1, or the pre-fetch scheduler of FIG. 2, as described above.

Figure 4:
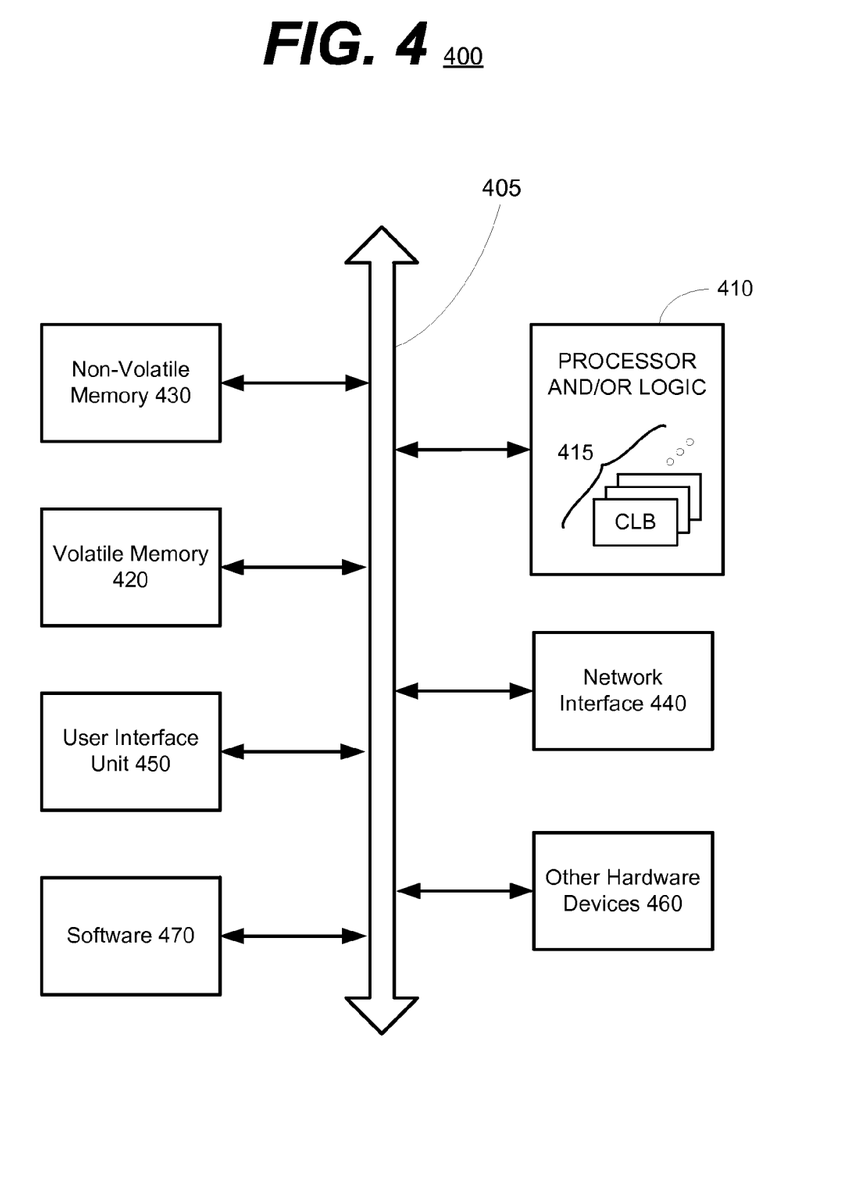
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM), etc.). The information processing system 400 according to the disclosed subject matter may further include a non-volatile memory 430 (e.g., a hard drive, an optical memory, a NAND or Flash memory, etc.). In some embodiments, the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 400 according to the disclosed subject matter may further include a user interface unit 450 (e.g., a display adapter, a haptic interface, a human interface device, etc.). In various embodiments, this user interface unit 450 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor, etc.). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440, etc.) of the information processing system 400. In such an embodiment, the information processing system 400 may include one or more native applications, which may be installed locally (e.g., within the non-volatile memory 430, etc.) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a cache pre-fetcher configured to predict, based at least in part upon a virtual address, data to be retrieved from a memory system; and
a pre-fetch scheduler configured to:
convert the virtual address of the data to a physical address of the data, and
request the data from a determined one of a plurality of levels of the memory system, wherein:
if a determined level comprises a first level of the memory system, injecting requests for data for the pre-fetched data into a first level fill buffer configured to store requests for data to be stored within the first level of the memory system,
if the determined level comprises a second level of the memory system and if the second level fill buffer does include capacity to store the requests for data, injecting requests for data for the pre-fetched data into a second level fill buffer configured to store the requests for data to be stored within the second level of the memory system, and
if the determined level comprises the second level of the memory system and the second level fill buffer does not include capacity to store the requests for data, injecting requests for data for the pre-fetched data into a second level pre-fetch request buffer configured to store the requests for data that are to be placed within the second level fill buffer when the second level fill buffer comprises capacity for an additional request for data; and
wherein the memory system comprises a plurality of levels, each level of the memory system configured to store data.

2. The apparatus of claim 1, wherein the pre-fetch scheduler is configured to:
request the data be placed into one of a plurality of levels of the memory system based upon a predefined set of criteria involving an available amount of system resources.

3. The apparatus of claim 2,
wherein the predefined set of criteria involving an available amount of system resources comprises a determination as to whether the first level fill buffer is capable of storing more requests for data.

4. The apparatus of claim 2, wherein cache pre-fetcher is configured to cross a page boundary when predicting data to be retrieved from the memory system; and
wherein the predefined set of criteria involving an available amount of system resources comprises a determination as that the physical address of the data is not comprised by a restricted memory area.

5. The apparatus of claim 1, wherein the pre-fetch scheduler is configured to:
request the data from one of a plurality of levels of the memory system based upon the physical address of the data.

6. The apparatus of claim 1, wherein the pre-fetch scheduler is configured to:
request the physical address of the data from a translation look aside buffer.

7. The apparatus of claim 1, wherein the pre-fetch scheduler is configured to pre-fetch a translation look-aside buffer entry.

8. A method comprising:
predicting, based at least in part upon a virtual address, data likely to be accessed, from a memory system, by an instruction;
selecting, from a plurality of levels of the memory system, a determined level of the memory system to store pre-fetched data, wherein the pre-fetched data comprises the data predicted to be accessed by the instruction; and
causing the pre-fetched data to be stored by the determined level of the memory system before the pre-fetched data is accessed by the instruction, wherein:
if the determined level comprises a first level of the memory system, injecting requests for data for the pre-fetched data into a first level fill buffer configured to store requests for data to be stored within the first level of the memory system,
if the determined level comprises the second level of the memory system and if the second level fill buffer does include capacity to store the requests for data, injecting requests for data for the pre-fetched data into a second level fill buffer configured to store the requests for data to be stored within the second level of the memory system, and
if the determined level comprises the second level of the memory system and the second level fill buffer does not include capacity to store the requests for data, injecting requests for data for the pre-fetched data into a second level pre-fetch request buffer configured to store the requests for data that are to be placed within the second level fill buffer when the second level fill buffer comprises capacity for an additional request for data.

9. The method of claim 8, wherein selecting a determined level of the memory system comprises:
  selecting a first level of the memory system if the first level fill buffer associated with the first level of the memory system comprises capacity for an additional request for the pre-fetch data, and
  selecting the second level of the memory system if the first level fill buffer associated with the first level of the memory system does not comprise capacity for an additional request for the pre-fetch data.

10. The method of claim 8, wherein predicting data likely to be accessed by an instruction comprises:
  crossing a page boundary when predicting data.

11. The method of claim 8, wherein predicting data likely to be accessed by an instruction comprises:
  converting the virtual address associated with the pre-fetch data to a physical address; and
  determining that the physical address is not comprised by a restricted memory area.

12. The method of claim 8, wherein predicting data likely to be accessed by an instruction comprises:
  converting the virtual address associated with the pre-fetch data to a physical address via a translation look aside buffer; and
  wherein converting the virtual address comprises pre-fetching a translation look-aside buffer entry.

13. A system comprising:
  an execution unit configured to execute one or more instructions;
  a pre-fetch unit configured to:
    identify pre-fetched data by predicting, based at least in part upon a virtual address, data to be accessed by one or more of the instructions, and
    cause the pre-fetched data to be stored within a determined one of a plurality of levels of a memory system prior to the pre-fetched data being accessed by the instruction, wherein:
      if a determined level comprises a first level of the memory system, injecting requests for data for the pre-fetched data into a first level fill buffer configured to store requests for data to be stored within the first level of the memory system,
      if the determined level comprises a second level of the memory system and if the second level fill buffer does include capacity to store the requests for data, injecting requests for data for the pre-fetched data into a second level fill buffer configured to store the requests for data to be stored within the second level of the memory system, and
      if the determined level comprises the second level of the memory system and the second level fill buffer does not include capacity to store the requests for data, injecting requests for data for the pre-fetched data into a second level pre-fetch request buffer configured to store the requests for data that are to be placed within the second level fill buffer when the second level fill buffer comprises capacity for an additional request for data; and
    the memory system comprising a plurality of levels, wherein each level of the memory system is configured to store data.

14. The system of claim 13, wherein the pre-fetch unit is configured to cross a page boundary when predicting data to be accessed by the one or more of the instructions; and
  convert the virtual address associated with the pre-fetched data to a physical address.

15. The system of claim 13, wherein the pre-fetch unit is configured to:
  request a physical address associated with the pre-fetched data from a translation look-aside buffer, and
  cause the translation look-aside buffer to pre-fetch a translation look-aside buffer entry.

* * * * *